United States Patent
Kadokawa (10) Patent No.: US 6,950,256 B2
(45) Date of Patent: Sep. 27, 2005

(54) MAGNETIC STORAGE MEDIUM, METHOD FOR CONTROLLING TRACK PITCH THEREOF, AND MAGNETIC RECORDER FOR MEDIUM

(75) Inventor: Kouichi Kadokawa, Niihama (JP)

(73) Assignee: Matsushita Electric Industrial Co., Ltd. (JP)

(*) Notice: Subject to any disclaimer, the term of this patent is extended or adjusted under 35 U.S.C. 154(b) by 317 days.

(21) Appl. No.: 10/257,133

(22) PCT Filed: Feb. 4, 2002

(86) PCT No.: PCT/JP02/00903

§ 371 (c)(1),
(2), (4) Date: Oct. 9, 2002

(87) PCT Pub. No.: WO02/065460

PCT Pub. Date: Aug. 22, 2002

(65) Prior Publication Data

US 2003/0048561 A1 Mar. 13, 2003

(30) Foreign Application Priority Data

Feb. 9, 2001 (JP) ........................................ 2001-033028

(51) Int. Cl.$^7$ ................................................. G11B 5/09
(52) U.S. Cl. .......................... 360/48; 360/76; 360/78.04
(58) Field of Search .............................. 360/48, 75, 76, 360/78.04

(56) References Cited

U.S. PATENT DOCUMENTS

| 4,630,144 A | | 12/1986 | Kutaragi |
| 4,945,427 A | * | 7/1990 | Cunningham ................. 360/75 |
| 5,936,789 A | | 8/1999 | Mukohara |
| 6,052,250 A | * | 4/2000 | Golowka et al. ......... 360/77.08 |
| 6,151,187 A | * | 11/2000 | Ogawa ..................... 360/78.14 |

FOREIGN PATENT DOCUMENTS

| JP | 6-60573 | 3/1994 |
| JP | 7-45004 | 2/1995 |
| JP | 7-211004 | 8/1995 |
| WO | WO 96/28814 | 9/1996 |

* cited by examiner

*Primary Examiner*—David Hudspeth
*Assistant Examiner*—Daniell L. Negrón
(74) *Attorney, Agent, or Firm*—Steptoe & Johnson LLP (57) ABSTRACT

A magnetic storage medium is configured to store data along tracks on a disk-shaped storage medium. A distance between the tracks adjacent to each other in a radius direction of the storage medium is different depending on each position in a radius direction of the storage medium.

6 Claims, 9 Drawing Sheets

PRIOR ART

FIG. 9

PRIOR ART

MAGNETIC STORAGE MEDIUM, METHOD FOR CONTROLLING TRACK PITCH THEREOF, AND MAGNETIC RECORDER FOR MEDIUM

TECHNICAL FIELD

The present invention relates to a magnetic storage medium, a method of controlling a track pitch thereof, and a magnetic recorder for the medium. To be specific, the present invention relates to a TPI optimizing method for a track pitch direction (radius direction of a magnetic disk as a magnetic storage medium) in a fixed magnetic recorder, which uses a positioning mechanism including a magnetic recording/reproducing head of a rotary (swing arm) method, concerns a fixed magnetic recorder using the optimizing method, and a magnetic disk thereof.

BACKGROUND ART

In recent years, most fixed magnetic recorders (HDD: hard disk drive) have improved in various element technologies in response to increasing demand for higher recording density. Decisive elements for determining a recording density of a HDD include a magnetic head, a storage medium, a recording/reproducing channel, and a positioning mechanism. In order to maintain further improvement of recording density in response to the current trend in the future, it is important not only to improve the individual element technologies but also to combine the individual element technologies as a system to examine the entire effect. To be specific, in order to achieve ultra-high density, it is necessary to dramatically improve recording density both in the linear recording direction (BPI) and the radius direction (TPI) of a disk formed like a circular plate.

As to technology of heads, using a GMR (gigantic magnetic resistor) head has successfully improved capability of reproducing a magnetic recording signal and has remarkably contributed to higher density mainly in the linear recording direction of a disk. As to magnetic mediums for recording data read by the GMR head, technology for lower noise, higher coercive force, and so on has improved, and as to an HDI (head disk interface) and a mechanical servo system, technology for reducing a flying height of a head and technology for positioning a head have improved so as to remarkably contribute to higher recording density in the radius direction of a disk.

Unlike a CD-ROM, a DVD-ROM, a FD, etc. having a constant linear velocity (CLV), a hard disk drive is designed with a constant number of revolution (CAV: constant angular velocity). Thus, although an angular velocity is constant at any radius, a linear velocity is different depending on each place. Namely, a linear velocity tends to be larger on the outer circumference than the inner circumference of a magnetic disk. Hence, if it is assumed that data recorded on a magnetic disk has a constant recording frequency at any radius, the outer circumference of the disk is larger in minimum interval of magnetic inversion between each other adjacent pieces of data in the data track tangent direction as compared with the inner circumference, thereby reducing a recording density. Namely, recording is less efficient on the outer circumference as compared with the inner circumference.

In order to correct the problem as much as possible, so-called zone bit recording (ZBR) method has been adopted in which data is divided into some zones (e.g., 16 zones or 8 zones) in a radius direction, a recording frequency is switched for each of the zones to change the number of sectors in the data, and therefore a difference in minimum interval of magnetic inversion between radiuses is reduced. This method is sometimes referred to as constant density recording. This method changes and optimizes a recording density in a linear recording direction for each zone, so that recording efficiency in the BPI (Bit Per Inch) direction can be improved entirely on the device.

However, the transfer rates of existing devices are limited because of the processing speed of a semiconductor chip such as a data channel for performing modulation and demodulation and a hard disk controller for performing serial/parallel conversion. Further, another method is available which reduces the number of revolution of a magnetic disk and sacrifices performance to lower a transfer rate. However, this method is hard to be a positive solution and does not remarkably match the needs of the marketplace. The industry rather intends to increase the number of revolution to raise a transfer rate. Therefore, in the future, it can be expected that a recording density in a radius direction rather than a linear recording direction will be raised to increase a capacity, and therefore the entire capacity will be efficiently increased, which will become an essential condition.

DISCLOSURE OF INVENTION

The objective of the present invention is to improve efficiency on a recording density in a radius direction of a disk-shaped magnetic storage medium.

In order to attain the above objective, the magnetic storage medium of the present invention is configured such that data can be stored along a track on the disk-shaped storage medium, and a distance between adjacent tracks in a radius direction of the storage medium is different depending on each position in the radius direction of the storage medium.

According to the present invention, a magnetic recorder for storing data along the track on the disk-shaped storage medium includes recording/reproducing means for recording data in the storage medium and reading the data, position control means for causing the recording/reproducing means to access a desired track, optimizing means for making decision so as to have a track pitch allowing a ratio of a width of a guard band to a track width to be constant at any radius on a data zone, the guard zone separating data tracks adjacent to each other in a radius direction of the storage medium, and means for storing a plurality of pieces of selectable track pitch data for making variable the track pitch on the storage medium.

In a magnetic recorder which has a plurality of data surfaces on the storage medium, the data surfaces corresponding to a plurality of heads for recording data on the disk-shaped storage medium and reading the data, and is configured so as to store data along tracks on the data surfaces, a method of controlling a track pitch according to the present invention includes a step of controlling a track pitch independently on each of the data surfaces based on a signal read from the heads such that a radio of a guard band width to a track width is constant at any radius on a data zone, the guard band separating data tracks adjacent to each other in a radius direction of the storage medium.

Further, a magnetic storage medium of the present invention adopts zone bit recording method and is configured such that data can be stored along a track on the disk-shaped storage medium and a distance between tracks adjacent to each other in a radius direction of the storage medium is different depending on each zone.

Therefore, according to the present invention, it is possible to efficiently set the guard band with respect to the radius direction of the disk-shaped magnetic storage medium and to improve recording density of data. Hence, even when the same components are provided, more tracks can be obtained as compared with conventional devices. Thus, it is possible to recover defective products which do not satisfy the number of tracks conforming to specifications in conventional shipping tests, thereby improving yields of products.

Particularly according to the above-described track pitch controlling method, even in the case of a device having a plurality of heads, that is, a device having a plurality of data surfaces, it is possible to efficiently arrange the width of the guard band between adjacent tracks with respect to a width of data at each place along a radius direction of the disk on each of the data surfaces.

Moreover, particularly according to the magnetic storage medium of the zone bit recording method, it is possible to efficiently arrange the width of the guard band between adjacent tracks with respect to a width of data on each zone along a radius direction of the disk.

A magnetic storage medium according to the present invention has a plurality of data surfaces corresponding to a plurality of heads on the disk-shaped storage medium and is configured such that data can be stored along tracks on each of the data surfaces and a distance between tracks adjacent to each other in a radius direction of the storage medium is independently different depending on each position in the radius direction of the storage medium on each of the data surfaces. With this configuration, even in the case of a device having a plurality of heads, that is, a device having a plurality of data surfaces, it is possible to set a track pitch at an optimum value according to a position in the radius direction on each of the data surfaces.

Further, a magnetic storage medium of the present invention is configured so as to store data along tracks on the disk-shaped storage medium, and the tracks are placed such that a ratio of a width of a guard band to a width of the track is constant at any position on the data zone along a radius direction of the storage medium, the guard band separating tracks adjacent to each other in the radius direction of the storage medium. With this configuration, it is possible to provide a magnetic storage medium which can set the ratio of the guard band width to the data width at an optimum value on any data region along the radius direction of the disk.

In a magnetic recorder for storing data along tracks on the storage medium, a method of controlling a track pitch of the present invention controls a track pitch such that a ratio of a width of a guard band to a width of the track is constant at any radius on a data zone, the guard band separating data tracks adjacent to each other in a radius direction of the storage medium, based on a signal read from recording/reproducing means for recording data in the storage medium and reading data. With this configuration, it is possible to efficiently arrange the guard band at each place along the radius direction of the disk, thereby improving efficiency on recording density.

A magnetic recorder has a plurality of data surfaces on the storage medium, the data surfaces corresponding to a plurality of heads for recording data on the disk-shaped storage medium and reading the data, and is configured so as to store data along tracks on each of the data surfaces. The magnetic recorder includes position control means for causing the heads to access a desired track, optimizing means for making decision such that a distance between tracks adjacent to each other in a radius direction of the storage medium is independently made optimum depending on each position in the radius direction of the storage medium on each of the data surfaces based on a signal read from the heads, and means for storing a plurality of pieces of selectable track pitch data for making variable a track pitch on each of the data surfaces of the storage medium. With this configuration, even in the case of a device having a plurality of heads, that is, a device having a plurality of data surfaces, it is possible to efficiently arrange a width of the guard band between adjacent tracks with respect to a width of data at each place along a radius direction of the disk on each of the data surfaces, thereby improving efficiency on recording density.

A magnetic storage medium of the present invention is shaped like a disk, has a plurality of data surfaces where data is recorded and read by a plurality of heads, and is configured such that data can be stored along tracks on each of the data surfaces, and position control means causes the heads to access a desired track. The magnetic storage medium records an optimizing program for making decision based on a signal read from the heads such that a distance between tracks adjacent to each other in a radius direction of the storage medium is independently optimum depending on each position in the radius direction of the storage medium on each of the data surfaces. With this configuration, even in the case of a device having a plurality of heads, that is, a device having a plurality of data surfaces, it is possible to efficiently arrange a width of a guard band between adjacent tracks with respect to a width of data at each place along the radius direction of the disk on each of the data surfaces, thereby improving efficiency on recording density.

A magnetic storage medium of zone bit recording method according to the present invention is configured such that data can be stored along a plurality of tracks corresponding to a plurality of heads on the disk-shaped storage medium and a distance between tracks adjacent to each other in a radius direction of the storage medium is independently different depending on each zone on each of the data surfaces corresponding to the heads. With this configuration, even in the case of a device having a plurality of heads, that is, a device having a plurality of data surfaces, it is possible to set a track pitch at an optimum value for each zone on each of the data surfaces.

Further, a magnetic storage medium of zone bit recording method according to the present invention is configured such that data can be stored along a plurality of tracks corresponding to a plurality of heads on the disk-shaped storage medium, and the tracks are arranged such that a ratio of a width of a guard band to a width of the track is constant on the inner circumference or the outer circumference of each zone, the guard band separating tracks adjacent to each other in a radius direction of the storage medium. With this configuration, it is possible to provide a magnetic disk by which a ratio of a width of a guard band between adjacent tracks to a width of data along the radius of the disk is set at an optimum value on any zone.

BEST MODE FOR CARRYING OUT THE INVENTION

Prior to explanation on embodiments of the present invention, the conventional technology of the present invention will be firstly discussed in detail.

Figure 8:
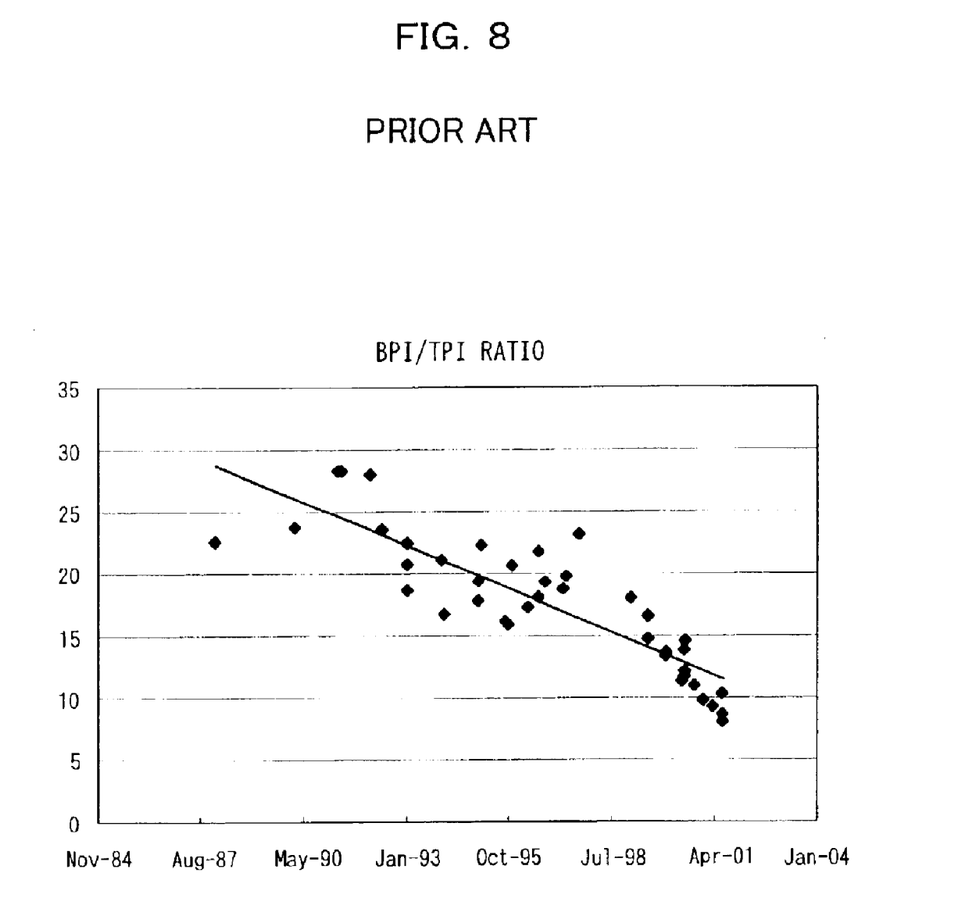
FIG. 8 is a graph showing a tendency of a BPI/TPI ratio according to a conventional art.

FIG. 8 shows changes in BPI (Bit Per Inch) and TPI (Track Per Inch) as to a conventional model of a magnetic recorder. In this graph, a horizontal axis represents time and a vertical axis represents BPI/TPI ratios. According to a conventional trend, ratios of BPI and TPI (BPI/TPI) are distributed between 10 and 30, and the center is located around 20. It seems that the trend of high TPI will be widely mainstream in the future. In other words, this means that BPI/TPI ratios will be smaller and products with BPI/TPI ratios lower than 10 will appear one after another. This indicates that a recording density in the TPI direction is more likely to increase rather than the BPI direction. In order to maintain this trend, further improvement is essential on a magnetic head, a slider, a storage medium, a recording code, a servo, and positioning technology. However, in the conventional devices, optimization in the BPI direction is finely performed but an optimum design is not made in the TPI direction.

Most positioning mechanisms of conventional magnetic disk units adopt a rotary (swing arm) method. This method is used for small units in most cases. This method causes a head assembly to make circular arc motion with a rotation axis being located at the center. This method can achieve a small mass of the entire head assembly and therefore necessary power is low. Further, since the structure is simplified, the unit can be compact. It is possible to adopt a configuration in which the head assembly can be balanced with the rotation axis being located at the center, thereby reducing the influence of external impact and soon. However, since the head makes circular arc motion, a problem of a skew angle (a slope angle of a head gap with respect to a track) arises. The limiting conditions of a skew angle are a stroke length and a rotary arm length.

Figure 9:
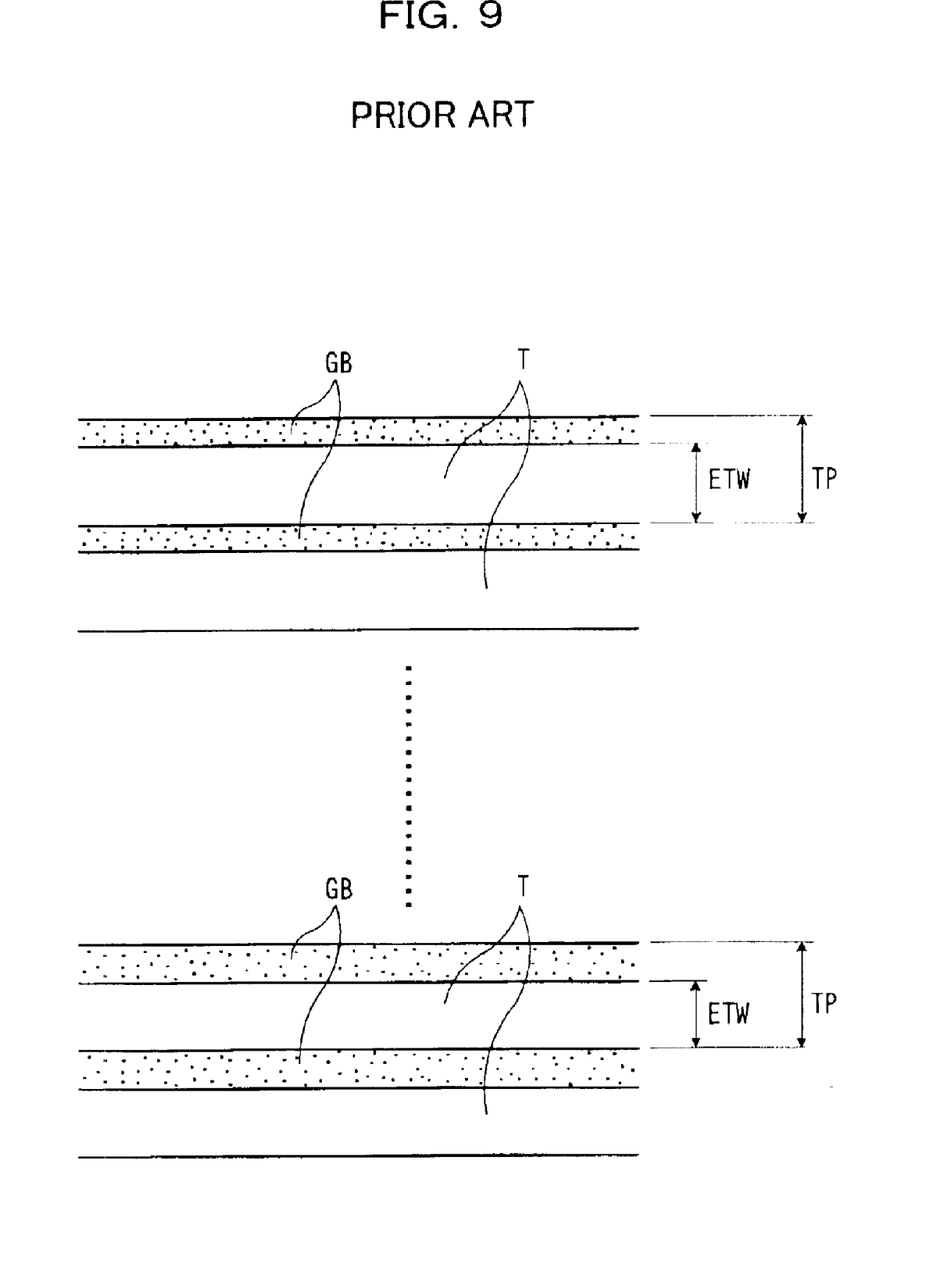
FIG. 9 is a diagram showing an effective track width of a disk according to the conventional art.

According to the above configuration, the head has a skew angle. Thus, as shown in FIG. 9, an effective track width ETW is different at each place in a data zone along a radius direction of a disk. Moreover, since track pitches TP are all constant in the conventional units, as to guard bands GB formed as spaces between tracks T to prevent crosstalk from occurring between the adjacent tracks T, the widths are changed with an effective track width ETW.

Further, depending upon variations in devices during a manufacturing process and the state of attaching a suspension and a slider, an effective track width ETW is different for each head. In the same unit, in the case where a plurality of heads is provided, an effective track width ETW is different for each head even when the heads have equal radiuses.

The trend of HDDs is shifting toward smaller units. Portable personal computers such as a notebook-sized personal computer and a PDA (Personal Digital Assistant: a kind of portable information terminal) have increased in ratio relative to desktop personal computers. This trend is also maintained in the US and it is therefore expected that small built-in HDDs will further increase in demand in the future.

In the case of small disks, the ratio of a stroke length to a rotary arm length is large in general, and skew angles have large deflection widths on the innermost circumference and the outermost circumference of a data region. Hence, fluctuations in effective track width are considerably affected. When density is higher in the future, such influence will increase and will not be negligible.

In a data stroke test at the time of shipment, a product cannot be recognized as a conforming product without obtaining a track satisfying a target capacity. Currently, the number of tracks to be obtained is determined with a large margin to reduce a fraction defective. Namely, the capacity is somewhat sacrificed.

Hence, the present invention is devised to increase efficiency on a recording density in a radius direction of a magnetic storage medium by solving the above-described problem. Hereinafter, embodiments of the present invention will be discussed in detail.

Figure 1:
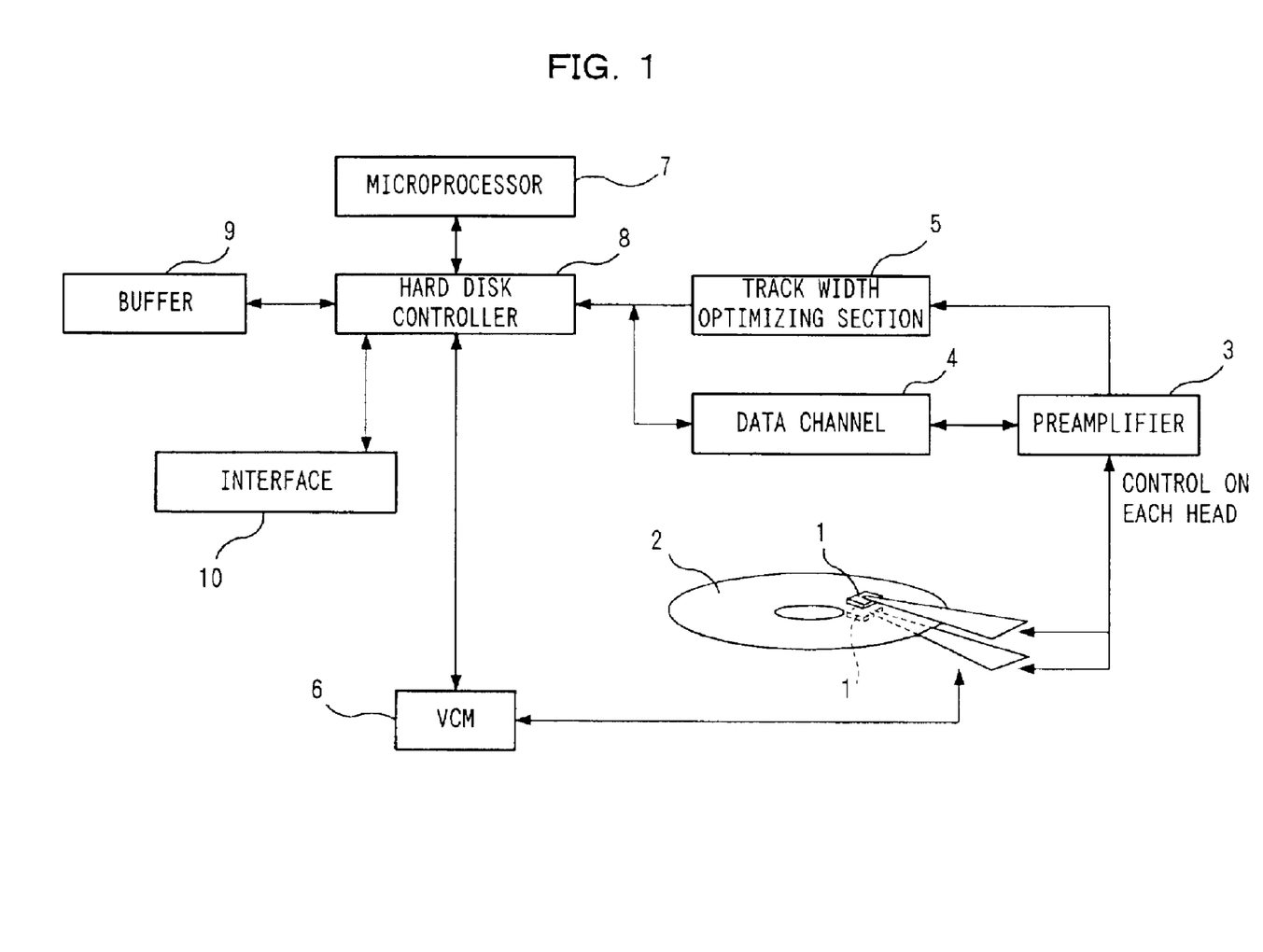
FIG. 1 is a block diagram showing a configuration of an embodiment of a fixed magnetic recorder according to the present invention.

In a magnetic recorder for storing data along a track on a disk-shaped storage medium, a fixed magnetic recorder according to an embodiment of the present invention comprises a head for recording data in the storage medium and reading the data, position control means for causing the head to access a desired track, optimizing means for making decision based on a signal read from the head so as to have an optimum track pitch, and a plurality of pieces of selectable track pitch data for making an interval between tracks variable on the storage medium. FIG. 1 is a block diagram showing a configuration of the recorder.

In FIG. 1, reference numeral 1 denotes a plurality of head structures, reference numeral 2 denotes a magnetic disk, and reference numeral 3 denotes a preamplifier. Each of the head structures 1 has a GMR head, and the heads are independently connected to lines leading to the preamplifier 3. The preamplifier 3 can set bias current flowing to an MR (GMR) element and amplify a reproduced signal from the head. The amplified ratio (gain) normally ranges from about 150 to 200 times. For example, supposing the head structure 1 has an amplitude level of 500 $\mu$V, when the preamplifier 3 has a gain of 180, the output is computed as below.

500 $\mu$V×180=90 mV

The output of the preamplifier 3 is connected to a device data channel 4. The data channel 4 shapes an analog signal from the preamplifier 3 so as to readily perform digital processing. The data channel 4 is an integrated circuit including a block such as an AGC (Auto Gain Control), an LPF (Low Pass Filter), an AD (Analog to Digital) converter, PR (Partial Response) equalization, a viterbi decoder, a recording decoder, and so on.

The AGC reads a differential signal from the preamplifier 3, the signal being obtaining by amplifying the output of the head by several hundreds times, and the AGC adjusts the signal to a certain amplitude level (e.g., 500 mVpp). When a plurality of heads are provided as shown in FIG. 1, a differential signal from the preamplifier 3 is different depending upon the capability of each of the heads and the performance of the magnetic head, and so on. For example, the differential signal is at 140 mV at one head and is 160 mV at another head. In order to smoothly perform processing in the post-stage block, these values are adjusted so as to have a uniform potential difference (e.g., 500 mVpp) in the AGC block.

The LPF removes a high frequency component which is not used as a recording/reproducing signal of data and increases a signal-to-noise ratio. Normally, a cut-off frequency is used which is equal to or 2.5 times larger than a reproduced signal frequency to be actually used.

The AD converter binarizes a differential analog signal from the LPF and converts the signal into a digital signal of 0 or 1.

The PR equalization corrects a high-band attenuating characteristic which causes waveform interference.

The viterbi decoder corrects an error during detection by using correlation between pieces of data.

The recording decoder converts written data into original data by making conversion to a code suitable for a recording signal.

The plurality of addressed heads are connected to the bias current source via their respective switches. The function of a selector switch for selecting which head can be realized by a switched circuit using a semiconductor device. A track width optimizing section 5 includes a circuit for computing an effective track width from a signal of the preamplifier 3 and a circuit for optimizing the guard bands. An internal circuit of the optimizing section 5 is constituted by a logic circuit based on a typical study of logic circuits. The discriminator thereof may be integrated in an integrated circuit such as a data channel or may be independently provided outside. Another method of realizing such processing is available using software instead of hardware. In this case, the program is stored in a system cylinder region of a buffer 9 or a magnetic disk 2 and is called when necessary.

An actuator for the heads is driven in a VCM (Voice Coil Motor) 6. The VCM 6 can drive the head structures 1 at a desired position in a radius direction of the magnetic disk 2.

Control is performed by a microprocessor 7 and a hard disk controller 8 of a disk drive. The hard disk controller 8 receives a proper value of a track pitch on a target radius from the buffer 9. Further, the hard disk controller 8 provides an instruction to set a track pitch at a proper value and specifies a track pitch according to an instructed optimum value.

The buffer 9 stores an optimum track pitch on each radius of the MR (GMR) head beforehand. The optimum track pitch is determined by optimization at the time of shipment from a factory.

The hard disk controller 8 controls the head structures 1 having the GMR heads so as to have access on a desired position of the magnetic disk 2 rotating at high speed (e.g., at 7200 rpm) when an instruction to access the magnetic disk 2 is received from the microprocessor 7.

An interface 10 mutually controls the exchange of data when the magnetic disk unit and other equipment such as a personal computer are connected to each other. Such an interface includes ATAPI, SCSI, and 1394.

Figure 2:
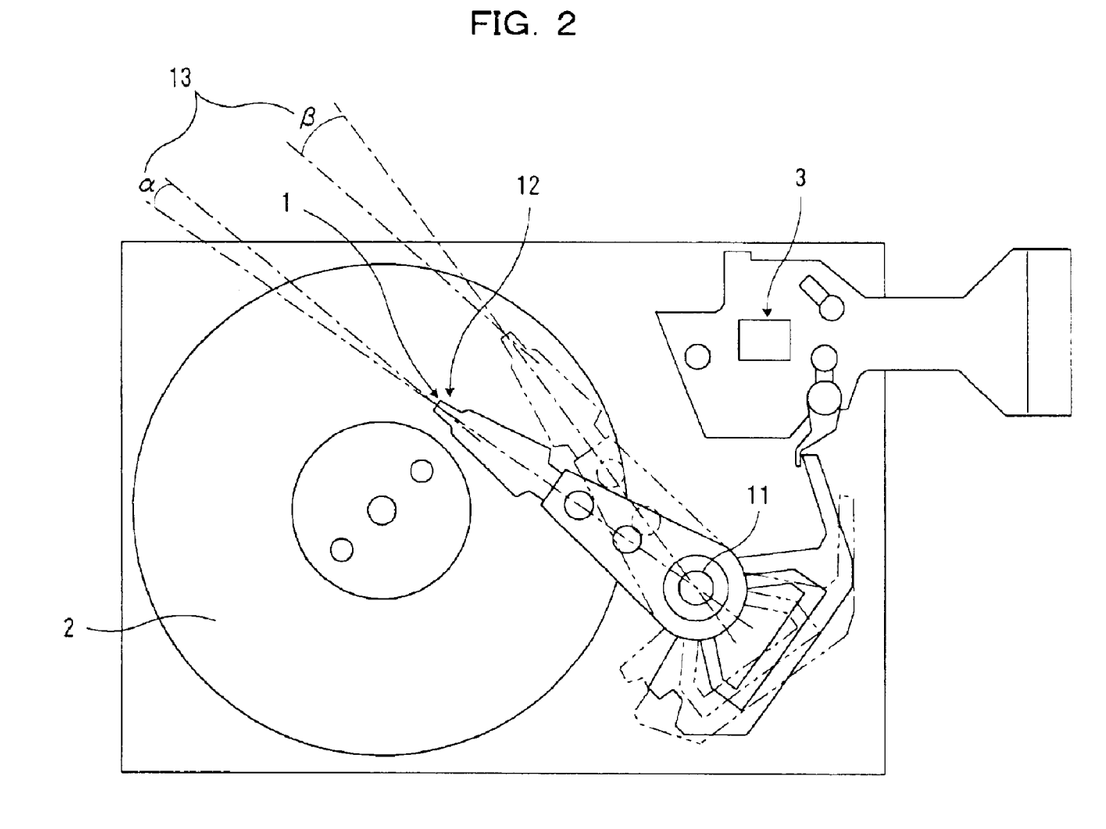
FIG. 2 is schematic drawing showing a fixed magnetic recorder using a typical swing arm method.

FIG. 2 schematically shows a configuration of a hard disk mechanism employing typical swing arm method. The head structures 1 have access on the magnetic disk 2 while rotating with an actuator center 11 serving as an axis. Thus, a skew angle (YAW angle) 13 exists between a tangent direction of a data track on the magnetic disk 2 and a straight line connecting a head gap 12 and the head structures 1. The skew angle 13 has a specific value for each accessed track. For example, $\alpha$ and $\beta$ of FIG. 2 present different skew angles.

Figure 3A:
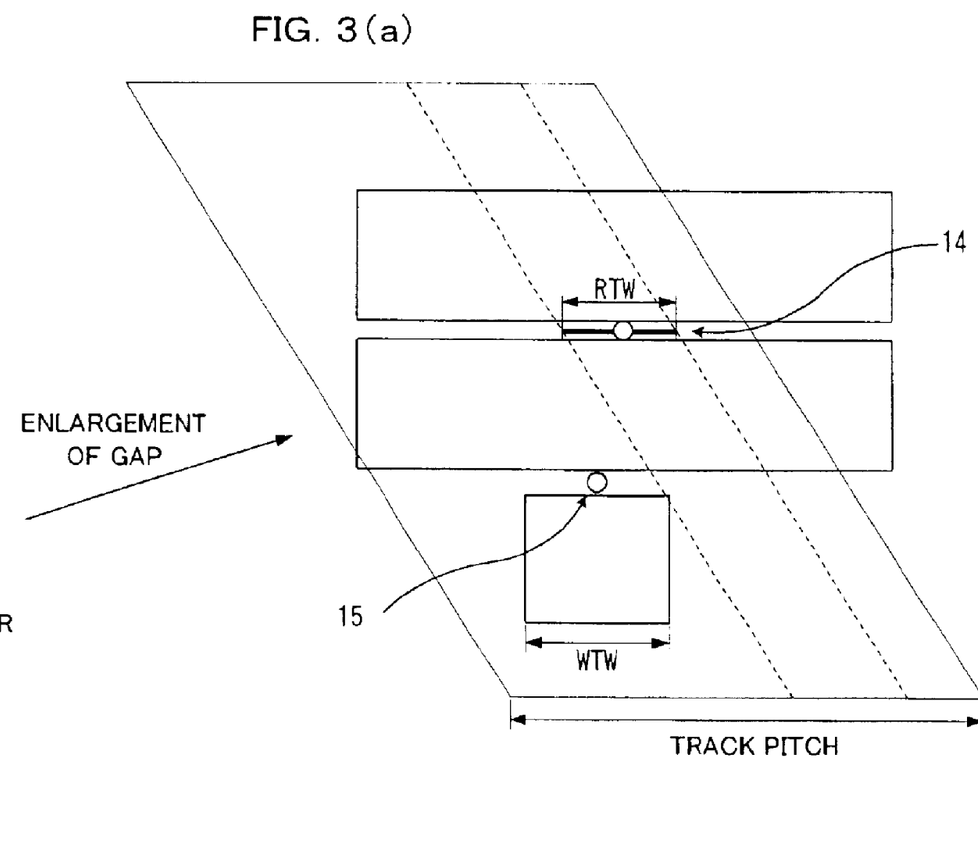
FIG. 3 is a schematic drawing showing an element of a typical recording and reproducing separation type head.
Figure 3B:
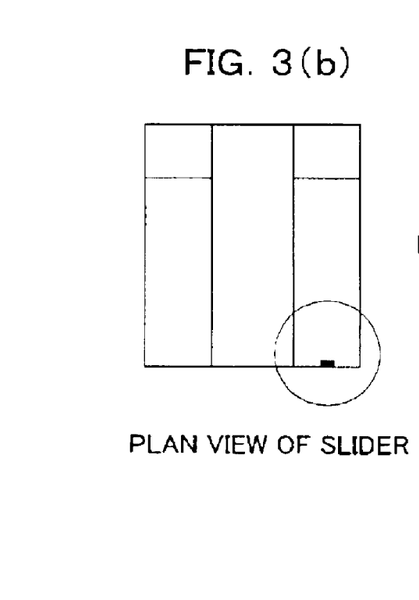

FIG. 3 shows a gap of the GMR head. Unlike an interactive head, a GMR sensor 14 for reading data and a write head 15 for writing data are independent from each other. A skew angle is formed between a track width along the length of the GMR sensor 14 and the write head 15 and a tangent of the magnetic disk 2. Thus, an effective track width which is actually read and written is changed according to the skew angle. In general, the larger the skew angle, an effective track width (magnetic track width) is smaller relative to an optical track width (mechanical track width) of an actual magnetic head.

Figure 4:
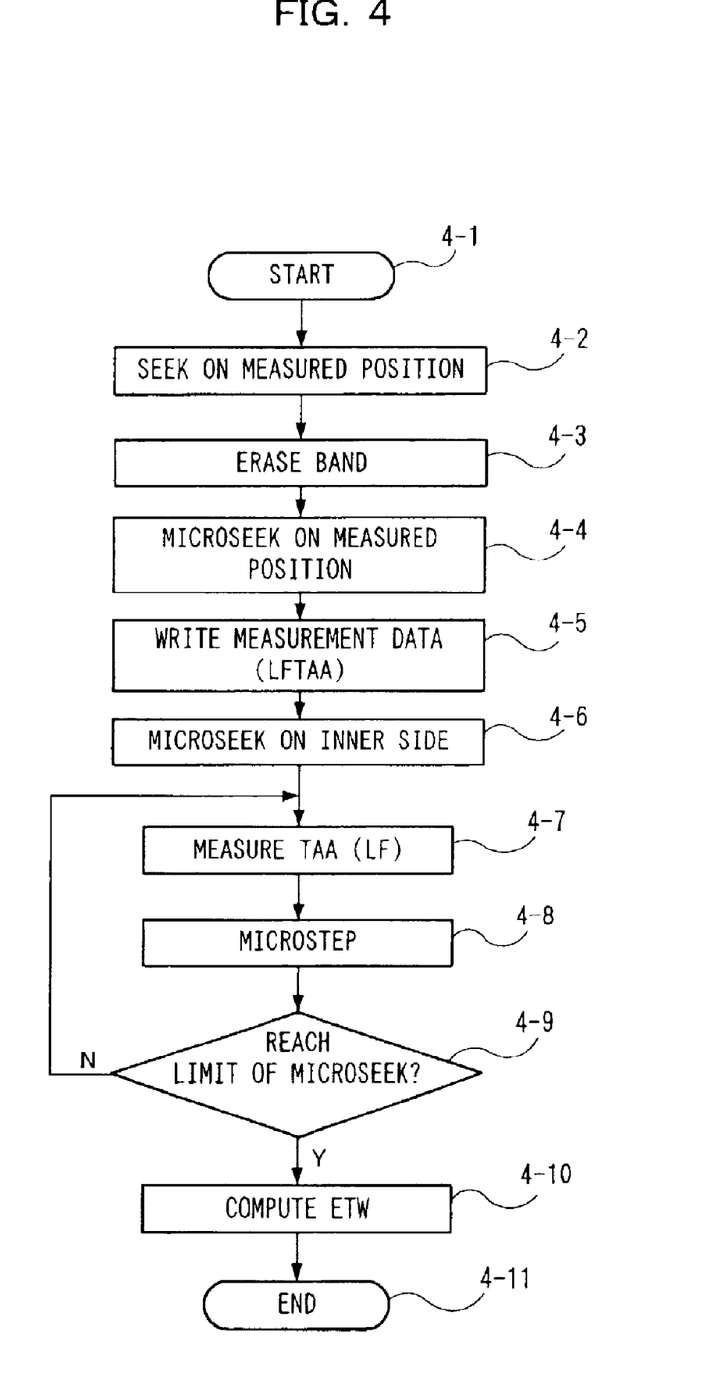
FIG. 4 is a diagram showing an algorithm on arithmetic of an effective track width according to an embodiment of the present invention.

FIG. 4 shows an example of a measurement algorithm of an effective track width (ETW). When processing is started in step 4-1, the VCM 6 is firstly driven in step 4-2, and the magnetic head roughly does seek on a position to be measured. And then, in step 4-3, DC erasing is performed on a place around the region to be measured and initialization is performed such that a written signal does not affect the current measurement. Normally, erasing on a region about five times as large as a mechanical track width of the writing head is sufficient. For example, when the head has a track width of 0.7 $\mu$m, DC erasing on a region of 0.7×5=3.5 $\mu$m is sufficient. Next, in step 4-4, seek (microseek) is finely done on the region to be measured. Subsequently, in step 4-5, measurement data is written on a current on-track position. Normally, writing is performed by using a lower frequency (LF) of data frequencies actually used on radius positions. Even on the same radius, some pieces of data to be recorded have six "0" between "1" and "1" like "10000001", or some pieces of data have three "0" like "10001". As a test frequency, an LF having a wide interval between "1" and "1" (many "0" are provided between "1") is adopted. Further, it is not always necessary to perform writing over the perimeter of the track. For example, it is possible to make setting so as to measure 50 periods of an LF from an index. And then, in step 4-6, microseek is performed on the inner circumference with the currently written position serving as a center reference. Microseek is performed at 1.5 $\mu$m on the inner circumference when a mechanical track width is set at, for example, 0.7 $\mu$m. Besides, although this explanation describes that seek is performed firstly on the inner circumference, seek may be performed on the outer circumference first. Subsequently, in step 4-7, TAA (Track Average Amplitude) of a test signal is measured. The test signal is written in advance at an LF at the center of the place where microseek has been performed. The data is stored in a memory such as a buffer. Subsequently, in step 4-8, microstep is performed on the outer circumference.

The amount of microstep is resolution at the time of measurement of an effective track width. Hence, the smaller the amount, accuracy of measurement improves. However, when the amount is smaller, measurement requires longer time. Thus, it is necessary to set a proper value. For example, when a mechanical track width is 0.7 $\mu$m, microstep of about 0.05 $\mu$m is sufficient.

And then, TAA is measured again on the same place. The data is stored again in the memory such as a buffer. Subsequently, microstep having the same amount as the previous microstep is performed on the outer circumference.

The above operations are repeated. And then, when microseek reaches its limit in step 4-9, the series of operations for measuring TAA is completed.

Figure 5A:
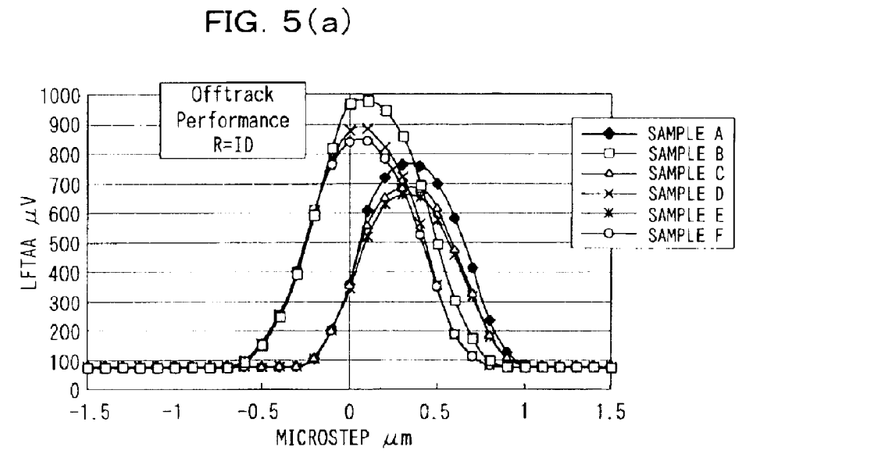
FIG. 5 is a diagram showing an example of off-track performance according to the embodiment of the present invention.
Figure 5B:
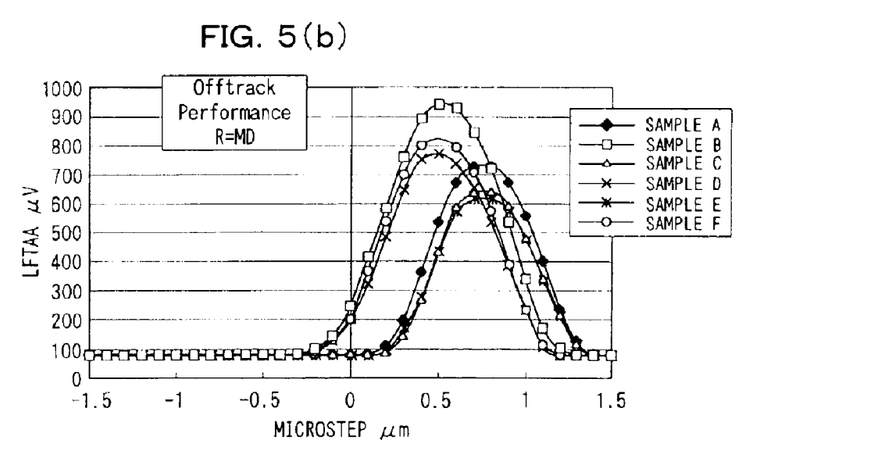
Figure 5C:
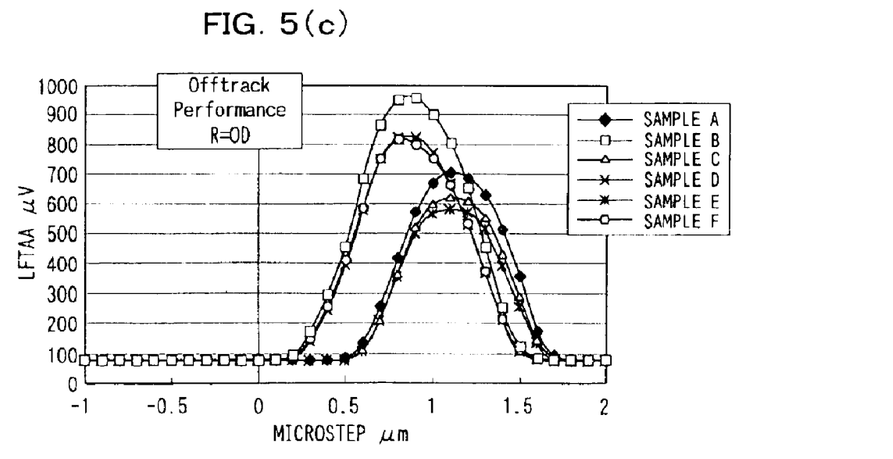

FIG. 5 shows examples of measurement results of TAA. Three graphs are shown in FIGS. 5(*a*), 5(*b*), and 5(*c*). These graphs show the results of the inner circumference, the middle circumference, and the outer circumference in the order of (a), (b), and (c). The horizontal axes of the graphs represent amounts of microstep and the vertical axes represent TAA values measured on respective positions. Samples A, B, C, D, E, and F represent six different heads, and pieces of data on the six heads are plotted on the same graph. Each of the heads has a different TAA characteristic when the position of the TPI direction is changed. Thus, it is understood that an effective track width ETW is different for each of the heads and a proper guard band and a proper track pitch are also different for each of the heads.

In this way, based on data on the relationship between microseek and TAA on each point, the data being stored in the memory such as a buffer, an effective track width ETW is computed in step 4-10 of FIG. 4. The processing is completed in step 4-11.

Figure 6:
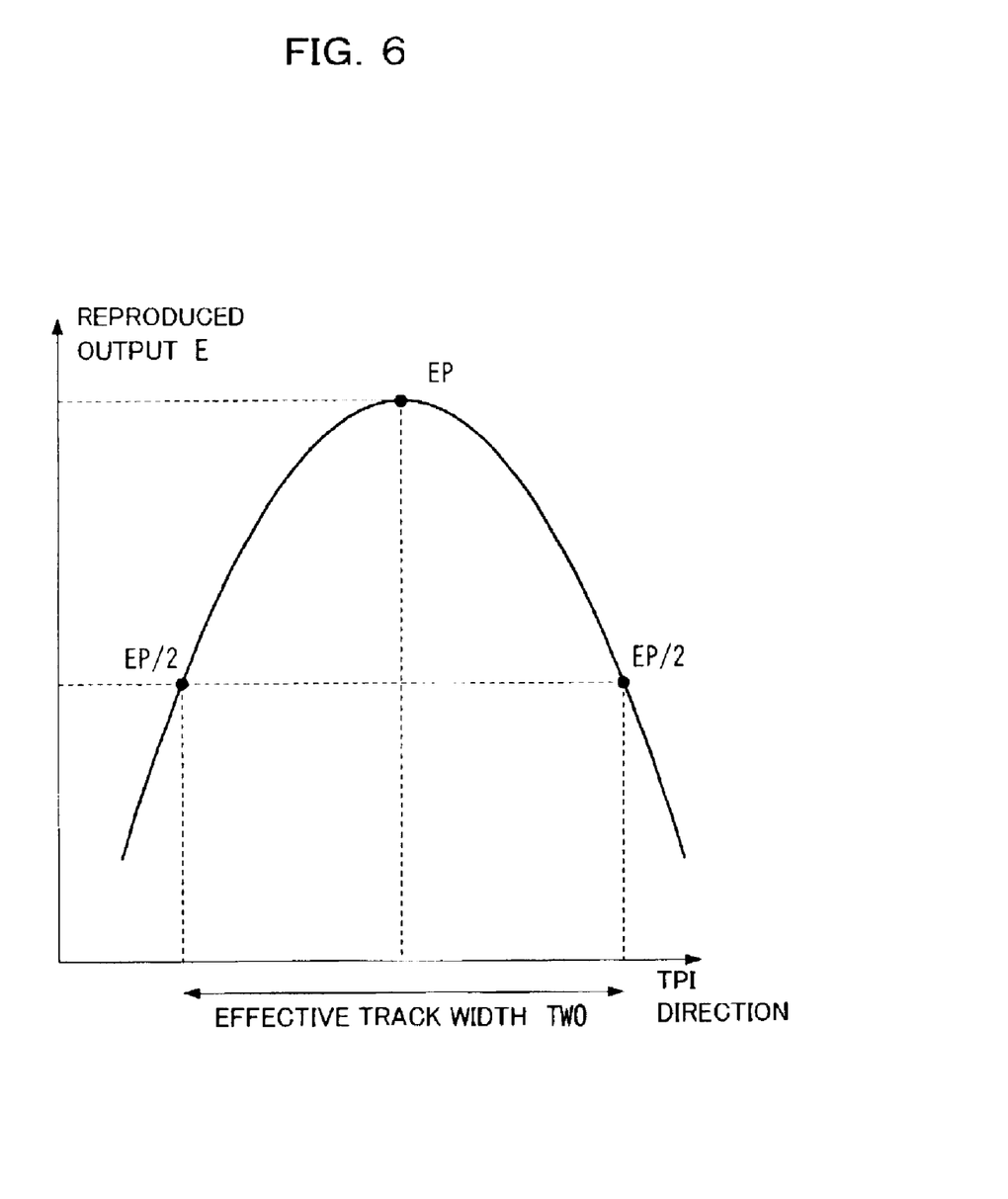
FIG. 6 is a diagram for explaining the definition of an effective track width according to the embodiment of the present invention.

FIG. 6 shows how reproduced output is changed when the head is shifted in the TPI direction. The horizontal direction represents displacement in the TPI direction and the vertical axis represents reproduced output at an LF frequency. Relative to EP with the maximum reproduced output E, a distance between a point in the outer circumferential direction and a point in the inner circumferential direction where the reproduced output E is 50% is defined as an effective track width. Optimization is performed so as to have a desirable track width on a design relative to the effective track width.

As to a device having a plurality of heads, such optimization is performed on each head and track at the time of shipment from a factory, for example, at servo writing. Alternately, on a magnetic disk unit using zone bit recording (ZBR), a method of performing optimization on each zone instead of each track is also available.

Figure 7:
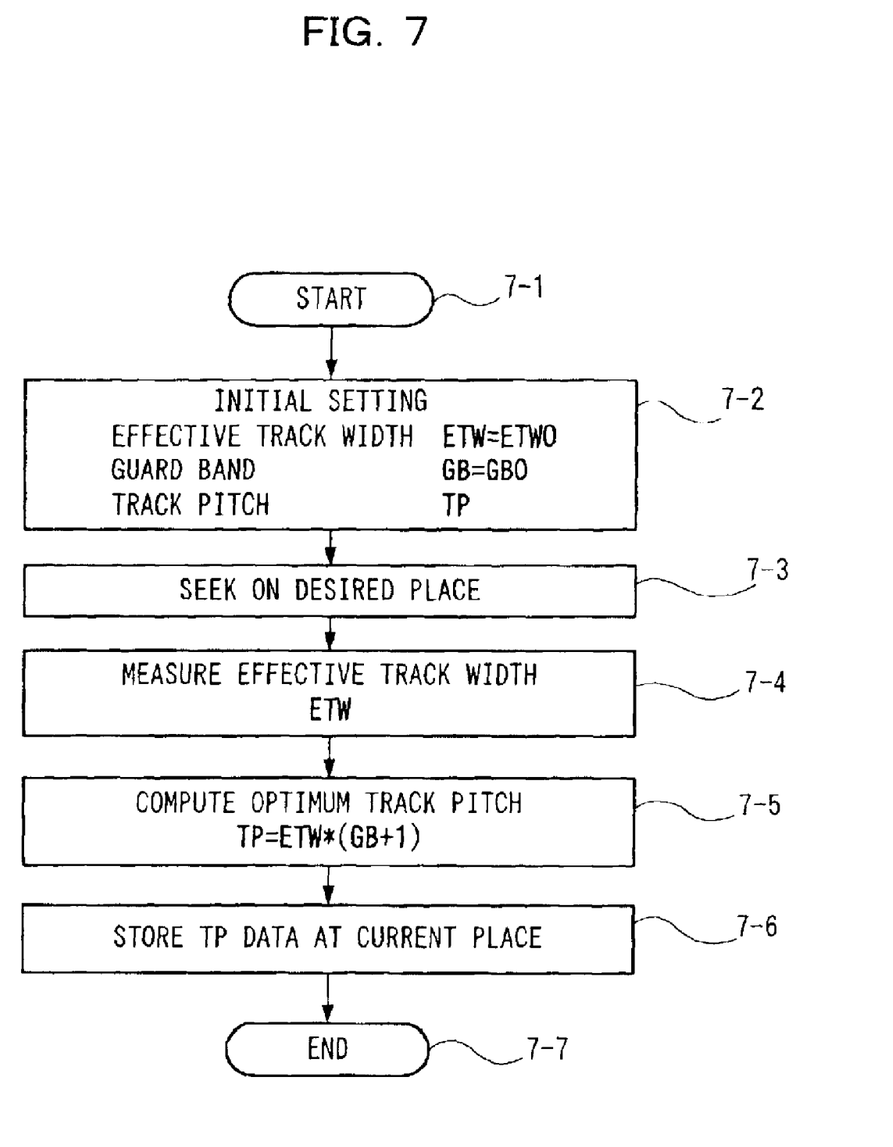
FIG. 7 is a diagram showing an algorithm of a process for optimizing a track pitch according to the embodiment of the present invention.

FIG. 7 shows a flow for setting an optimum track pitch. When processing is started in step 7-1, an initial value is firstly set in step 7-2. As an initial value ETW0 of an effective track width ETW, a track value measured not magnetically but mechanically (optically) is set. As a value GB0 of the guard band GB, a value of 0.1 to 0.2 is set as a default. As a value of track pitch TP, a target value during designing is selected. Next, in step 7-3, the head is sought on a position to be measured. When the head is caused to access a desired position, in step 7-4, an effective track width ETW is computed as shown in FIG. 4. And then, based on the value, an optimum track pitch TP is computed based on the value in step 7-5.

For example, the optimum track pitch TP is given by the equation below.

$$TP = ETW \times (GB+1)$$

If ETW of 0.7 $\mu$m and GB=0.12 $\mu$m are provided, TP=0.784 $\mu$m is computed. In this case, TPI along the radius direction of the disk is 32,398 as a result. And then, the result of TP at each point is stored in step 7-6, and the processing is completed in step 7-7. This processing is repeated for each place to be measured and each head.

The following correspondence table shows examples of set values of track pitches that correspond to the respective radiuses.

| Radius (mm) | ETW ($\mu$m) | GB ($\mu$m) | TP ($\mu$m) | TPI |
|---|---|---|---|---|
| 11.2 | 0.677 | 0.12 | 0.758 | 33,489 |
| 10.2 | 0.684 | 0.12 | 0.766 | 33,179 |
| 9.3 | 0.689 | 0.12 | 0.772 | 32,914 |
| 8.4 | 0.694 | 0.12 | 0.777 | 32,697 |
| 7.4 | 0.697 | 0.12 | 0.781 | 32,531 |
| 6.5 | 0.699 | 0.12 | 0.783 | 32,425 |

The above table obtained by measurements and arithmetic is written in a buffer or a storage cell such as a system cylinder of the magnetic disk. Here, these pieces of data are written in storage means which can store data even when the power is turned off. And then, data tracks are written based on the information and formatting is carried out. In this way, more data tracks can be obtained as compared with conventional means in which track pitches are all equal.

Thereafter, when data is read or written, it is preferable to specify the head and to have access after associating the number of tracks with the above described TP.

What is claimed is:

1. A magnetic disk-shaped storage medium comprising a track for storing data thereon by means of a head, wherein:

such head has a skew angle that affects fluctuations in effective track width defined by a distance between a point in an outer circumferential direction of said storage medium and a point in an inner circumferential direction of said storage medium where a reproduced output has a specific value, and a distance between tracks adjacent each other in a radius direction of said storage medium differs depending on the fluctuations of said effective track width, and the track is located such that a ratio of a guard band width to said effective track width is constant at any position on a data zone along a radius direction of said storage medium, the guard band separating tracks adjacent to each other in the radius direction of said storage medium.

2. A method of controlling a track pitch on a disk-shaped magnetic storage medium, comprising:

providing a disk-shaped magnetic storage medium and a head for storing and reading data on a track thereon, said head having a skew angle that affects fluctuations in effective track width defined by a distance between a point in an outer circumferential direction of such a disk-shaped storage medium and a point in an inner circumferential direction of such a storage medium where a reproduced output has a specific value, and a distance between tracks adjacent each other in a radius direction of such storage medium differs depending on the fluctuations of said effective track width, and controlling a track pitch, when storing data along a track on the storage medium by means of said head, based on a signal read from recording/reproducing means for recording and reading data in and from said storage medium, such that a ratio of a guard band width to said effective track is constant at any radius on a data zone, the guard band separating data tracks adjacent to each other in a radius direction of said storage medium.

3. A magnetic recorder for storing data and reading data along a track on a disk-shaped storage medium by means of a head, comprising:

a disk-shaped magnetic storage medium comprising a track for storing data thereon;

a head for storing and reading data on said track, wherein said head has a skew angle that affects fluctuations in effective track width defined by a distance between a point in an outer circumferential direction of said a disk-shaped storage medium and a point in an inner circumferential direction of such a disk-shaped storage medium where a reproduced output has a specific value, and a distance between tracks adjacent each other in a radius direction of such disk-shaped storage medium differs depending on the fluctuations of maid effective track width, and position control means for causing the head to access a desired track;

optimizing means for making a decision, based on the signal read from said head, to allow a ratio of a guard band width to said effective track width to be a track pitch constant at any radius on a data zone, the guard zone separating data tracks adjacent to each other in a radius direction of such storage medium; and means for storing a plurality of pieces of selectable track pitch data for making variable the track pitch on said storage medium.

4. A method of controlling a track pitch of a disk-shaped magnetic storage medium having a plurality of data surfaces corresponding to a plurality of heads for recording and reading data in and from said disk-shaped storage medium, and is able to store data along tracks on the data surfaces, the method comprising:

providing a disk-shaped magnetic storage medium and a head for storing and reading data on a track thereon, said head having a skew angle that affects fluctuations in effective track width defined by a distance between a point in an outer circumferential direction of said a disk-shaped storage medium and a point in an inner circumferential direction of said a disk-shaped storage medium where a reproduced output has a specific value, and a distance between tracks adjacent each other in a radius direction of said disk-shaped storage medium differs depending on the fluctuations of said effective track width, and controlling, based on a signal read from the heads, a track pitch independently on each of the data surfaces to allow a ratio of a guard band width to the effective track width to be constant at any radius on a data zone, the guard band separating data tracks adjacent to each other in a radius direction of said storage medium.

5. A magnetic recorder, comprising:

a storage medium having a plurality of data surfaces;

a plurality of heads for recording data on and reading data from a track on said plurality of data surfaces;

position control means for causing the heads to access a desired track;

optimizing means for making a decision, based on a signal read from each said head, to allow a distance between tracks adjacent to each other in a radius direction of said storage medium to be independently optimum depending on each position in the radius direction of the storage medium on each of the data surfaces, so that a ratio of a guard band width to the effective track width is constant at any radius on a data zone, the guard band separating data tracks adjacent to each other in a radius direction of said storage medium; and means for storing a plurality of pieces of selectable track pitch data for allowing a track pitch to be variable on each of the data surfaces of the storage medium, wherein the storage medium is configured such that, on each data surface, each head has a skew angle that affects fluctuations in effective track width defined by a distance between a point in an outer circumferential direction and a point in an inner circumferential direction where a reproduced output has a specific value, and a distance between tracks adjacent each other in a radius direction of said storage medium differs depending on the fluctuations of said effective track width.

6. A disk-shaped magnetic storage medium comprising a plurality of tracks corresponding to a plurality of heads for recording data thereon by a zone bit recording method, wherein:

each such head has a skew angle that affects fluctuations in effective track width defined by a distance between a point in an outer circumferential direction and a point in an inner circumferential direction where a reproduced output has a specific value, and a distance between tracks adjacent each other in a radius direction of said storage medium differs depending on the fluctuations of said effective track width, in said plurality of tracks, and said tracks are arranged so that a ratio of a guard band width to said effective width of the track is constant on an inner circumference or an outer circumference of each zone, the guard band separating tracks adjacent to each other in a radius direction of the storage medium.

* * * * *